Inventors
Manfred Depenbrock
Hans Christoph Skudelny

By Pierce, Scheffler & Parker
Attorneys

Feb. 7, 1967 M. DEPENBROCK ET AL 3,303,407

SELF-CONTROLLED INVERTER WITH A COMMUTATING OSCILLATORY CIRCUIT

Filed Nov. 13, 1963 9 Sheets-Sheet 2

Inventors
Manfred Depenbrock
Hans Christoph Skudelny
By Pierce Scheffler & Parker
Attorneys Inventors
Manfred Depenbrock
Hans Christoph Skudelny
By Pierce, Scheffler & Parker
Attorneys Inventors
Manfred Depenbrock
Hans Christoph Skudelny
By Pierce, Scheffler & Parker
Attorneys Feb. 7, 1967

M. DEPENBROCK ETAL 3,303,407

SELF-CONTROLLED INVERTER WITH A COMMUTATING OSCILLATORY CIRCUIT

Filed Nov. 13, 1963

9 Sheets-Sheet 5

Inventors
Manfred Depenbrock
Hans Christoph Skudelny

By Pierce, Scheffler & Parker
Attorneys

Inventors
Manfred Depenbrock
Hans Christoph Skudelny
By Pierce Scheffler & Parker
Attorneys Inventors
Manfred Depenbrock
Hans Christoph Skudelny
By Pierce, Scheffler & Parker
Attorneys Feb. 7, 1967 M. DEPENBROCK ETAL 3,303,407

SELF-CONTROLLED INVERTER WITH A COMMUTATING OSCILLATORY CIRCUIT

Filed Nov. 13, 1963 9 Sheets-Sheet 8

Inventors
Manfred Depenbrock
Hans Christoph Skudelny

By Pierce Scheffler & Parker
Attorneys

Feb. 7, 1967 M. DEPENBROCK ETAL 3,303,407

SELF-CONTROLLED INVERTER WITH A COMMUTATING OSCILLATORY CIRCUIT

Filed Nov. 13, 1963 9 Sheets-Sheet 9

Inventor
Manfred Depenbrock
Hans Christoph Skudelny

By Pierce, Scheffler & Parker
Attorney

United States Patent Office 3,303,407

Patented Feb. 7, 1967

3,303,407

SELF-CONTROLLED INVERTER WITH A COMMUTATING OSCILLATORY CIRCUIT

Manfred Depenbrock and Hans Christoph Skudelny, Mannheim-Feudenheim, Germany, assignors to Aktiengesellschaft Brown, Boveri & Cie, Baden, Switzerland, a joint-stock company Filed Nov. 13, 1963, Ser. No. 323,360
Claims priority, application Germany, Dec. 17, 1962, B 70,007
7 Claims. (Cl. 321—45)

This invention relates to a self-controlled inverter with a commutating oscillatory circuit.

Apart from the control means which determine the frequency of the generated alternating current or voltage, self-controlled inverters usually also require means for ensuring correct operational change-over between the controlled valves. In an inverter which is externally controlled the "beat" of the inverter is determined by a separate self-excited impulse generator. In a self-controlled inverter the generation of the controlling impulses may be effected by components incorporated in the inverter network in the form of an oscillatory circuit. These components may be so designed that the energy exchange between them can at the same time be used for generating transients which enforce the operational change-over between the valves, that is to say which cause what is usually described as commutation.

The transients required for commutation, which initiate the flow of current in a valve which has just been fired, and which reduce the flow of current to zero through the valve which is to be quenched may be generated for instance by the partial discharge of the condenser forming one element of the oscillatory circuit constituted by the said condenser and an inductance. This circuit will be referred to as the commutating oscillatory circuit.

As known, the process of commutation is usually associated with a following negative inverse voltage surge. This inverse voltage usually quickly fades and changes into the so-called positive inverse voltage at the end of a period of time within which the valve in question must have built up its full blocking resistance in conducting direction.

The negative inverse voltage which arises at the end of each commutation, and which has an initial value often referred to as the inverse surge, is an undesirable phenomenon in the operation of controlled valves. In the case of gas discharge valves this negative inverse voltage accelerates the remaining Hg ions in the discharge gap towards the anode during the period of deionization and causes atomization of the anode material. The atomized dust precipitates on the insulating surfaces where it forms conducting bridges and thereby reduces the life of the valve. In controllable semiconductor valves the sudden negative inverse voltage surge is a drawback for different physical reasons.

It is therefore always the aim, both in extraneously and in self-controlled inverters to reduce the magnitude of the negative voltage surge as much as possible or to suppress it. A known possibility of limiting the negative inverse voltage is to connect an uncontrolled valve in antiparallel across each of the controlled valves.

However, the application of such protective means against the development of negative inverse voltages calls for the provision of special means for ensuring commutation of the valves in the resultant voltage conditions.

One arrangement which has already been proposed for self-controlled inverters comprising a condenser in series with the load consists in connecting uncontrolled valves in antiparallel across each of the controlled valves and at the same time designing the condenser and the inductivity of the load which may possibly be supplemented by additional inductances in such a way as to constitute an oscillatory circuit with a degree of damping slightly below aperiodicity and so that the resonant period is slightly below the period of the alternating current that is to be generated, resulting in the current through each controlled valve passing through zero not later than at the end of a half wave before current can begin to flow through the valve which then takes over.

In an inverter of such a kind the wave forms of the alternating current and voltage are codetermined by the components of the oscillatory circuit and hence by the nature of the load. Consequently the additional introduction of further loads comprising different elements may affect the wave form of the alternating voltage of the inverter in a manner deviating from requirements.

It is desirable that the wave form of the alternating voltage delivered by the inverter should, so far as possible, be independent of the magnitude and nature of the load. This will be the case if the inverter generates a rectangular alternating voltage and if the frequency and magnitude of the voltage are independent of the load.

An inverter of such a kind requires an oscillatory circuit which is included in the valve circuit in such a way that it will function to commutate the valves in a manner substantially unaffected by the load. The present invention is concerned with an inverter of such a kind.

The invention relates to a self-controlled inverter with a commutating oscillatory circuit and controlled gas discharge or semiconductor valves, hereinafter referred to as main valves, for the generation of an alternating voltage of rectangular wave form which is not affected by the load.

According to the invention there is associated with each valve branch comprising a controlled valve operating as the main valve and an uncontrolled valve connected in antiparallel thereto, an oscillatory circuit comprising a condenser and an inductance in series with an arrangement consisting of a controlled valve operating as a commutating valve and an uncontrolled valve connected in antiparallel thereto, each main valve and associated commutating valve together with the oscillatory circuit forming a network extending from one pole of the D.C. voltage source of the inverter to the other pole of the D.C. voltage source and being so controlled that the main valve of each branch is fired at the beginning of the relative half wave of the alternating voltage and the associated commutating valve is fired at an instant which precedes the end of said half wave of the alternating voltage by an interval of time which is equal to or longer than one quarter of the period of oscillation of the oscillatory circuit, and in addition to the said valves a supplementary uncontrolled valve being connected to the oscillatory circuit, said supplementary valve carrying current and thereby affecting the recharging process of the condenser in preparation for the following half wave of the alternating voltage during the interval of time the other valves carry no current.

The invention will be illustratively described by reference to a number of embodiments exemplified in the accompanying drawings in which FIG. 1 represents the fundamental principle of the circuit arrangement of a known type of inverter;

FIGS. 2 and 3 show the wiring diagram in principle of two embodiments of the inverter according to the invention;

FIG. 4 contains a number of graphs representing the current and voltage relationships in an inverter of the kind proposed by the invention, whereas FIGS. 5 to 10 are diagrams showing the paths of the current through the inverter network in different functional stages;

Figure 1:
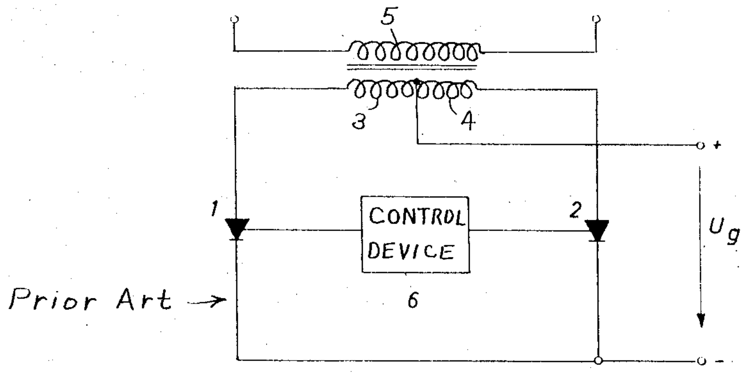

FIG. 1 illustrates the conventional basic circuit of a two-phase inverter comprising a transformer with a centre-tapped primary. The supplementary electrical elements required for determining the wave form of the alternating voltage and possibly for commutation as required in a self-controlled inverter are not shown. The inverter comprises two controlled valves 1 and 2 hereinafter referred to as main valves. These valves may be gas discharge or semi-conductor valves. They are each connected across one half 3 and 4 respectively of the transformer primary, the generated alternating voltage being delivered by the secondary winding 5. The voltage of the D.C. source is $U_g$. The valves are excited by a control device 6 which determine the frequency of the alternating voltage.

Figure 2:
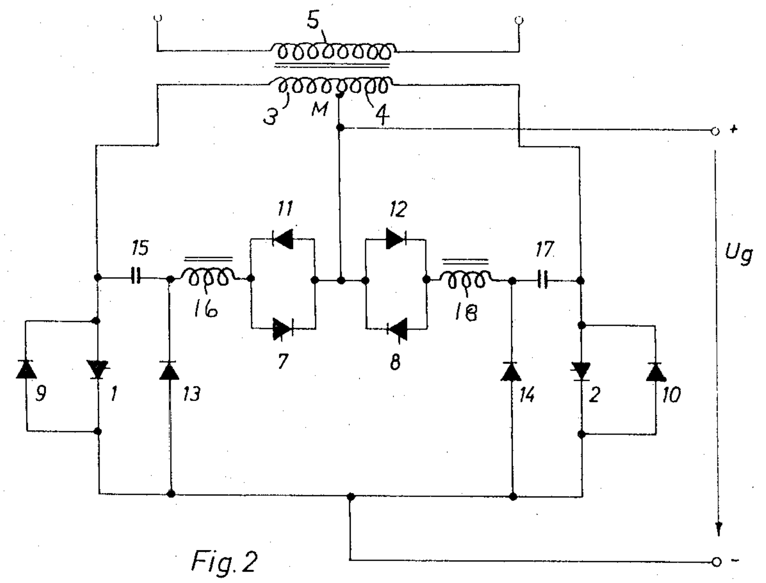
Figure 3:
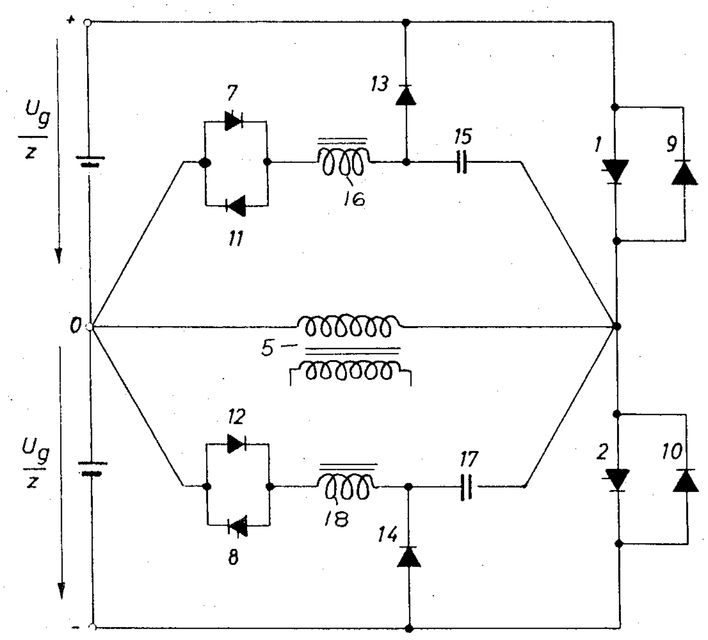

The construction of a two-phase inverter according to the invention is exemplified by the two embodiments shown in FIGS. 2 and 3. The arrangement according to FIG. 2 corresponds to the centre tap circuit illustrated in FIG. 1, also known as a one-way inverter because current flows through each of the halves of the transformer primary in only one direction. Two valve branches are jointly connected to the transformer.

In the arrangement illustrated in FIG. 3 the two valve branches are comprised in a system in which the D.C. sources are in series and the transformer primary is not tapped. This circuit is known as a two-way circuit because current flows through the transformer primary alternately in each direction. The arrangement corresponds to a rectifier in a voltage doubler. If the valve branches are duplicated the result is the known single-phase bridge circuit in which the formation of a centre point in the D.C. supply is not required.

The centre tap inverter circuit shown in FIG. 2 will be first described. In an antiparallel shunt across the controlled valves 1 and 2, which are the main valves, are uncontrolled valves 9 and 10 respectively. Associated with each of the two valve branches of the inverter thus formed is an oscillatory circuit in series with a valve referred to herein as a commutating valve which is likewise shunted in antiparallel by an uncontrolled valve. The commutating valve 7 and the uncontrolled antiparallel valve 11 are associated with one of the inverter branches. This assembly of valves is serially connected to the oscillatory circuit formed by a condenser 15 in series with an inductance 16. Conformably a commutating valve 8 and an uncontrolled valve 12, in series with an oscillatory circuit comprising a condenser 17 in series with an inductance 18 are also associated with the other inverter branch.

Each main valve and the associated commutating valve are contained in a network which in series with the associated oscillatory circuit connects one pole of the D.C. source to the other.

Figure 4:
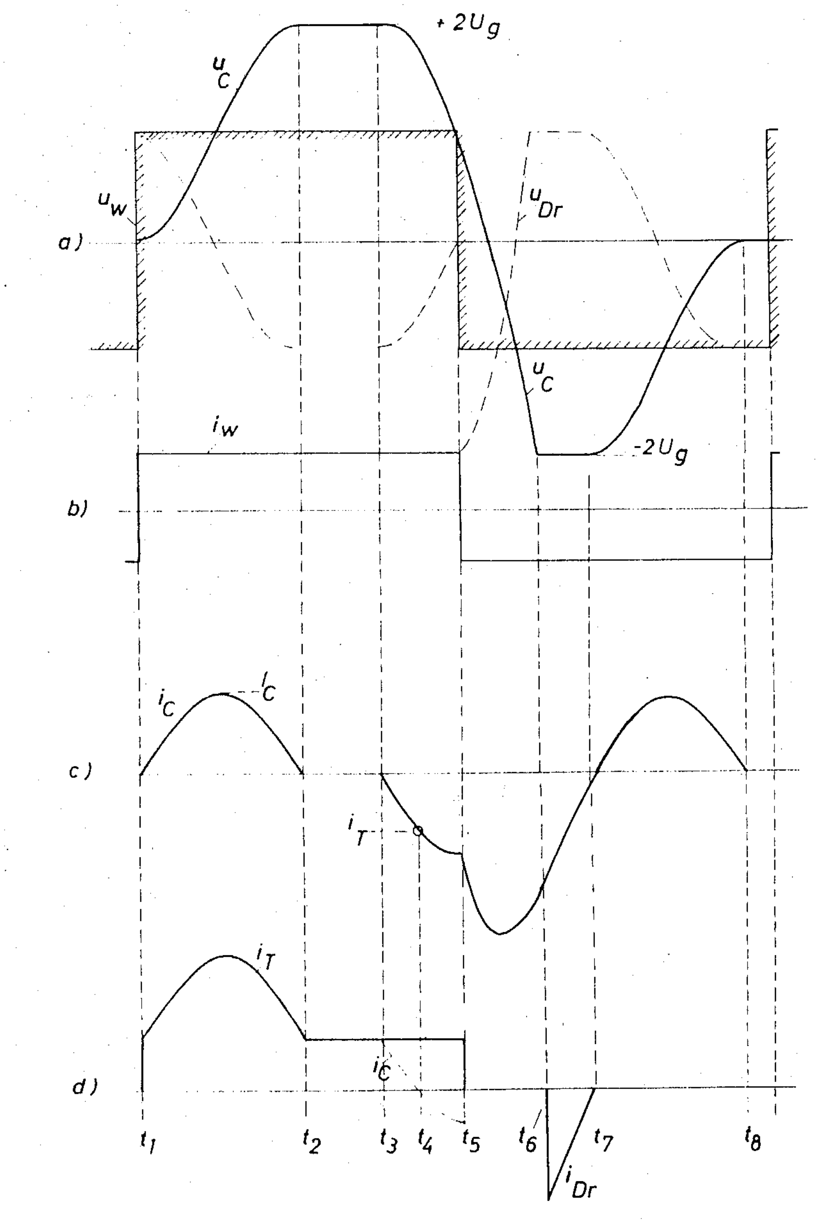

The manner in which the inverter according to FIG. 2 functions will be described by reference to the graphs in FIG. 4 representing the variation of currents and voltages in the course of a period and the diagrams in FIGS. 5 to 8 which indicate the current paths during the several intervals of time marked in FIG. 4.

FIG. 4 represents the variation of currents and voltages with respect to time in one of the valve branches of the inverter, in which the main valve is that marked 1 and the commutating valve that marked 7. The curves in FIG. 4*a* indicate that the positive half wave of the alternating voltage $u_W$ begins at the instant $t_1$. This instant is that at which the main valve 1 fires. Since this valve now conducts, the half winding 3 of the transformer primary is directly connected to the D.C. voltage $U_g$, so that a voltage proportional to this constant voltage will appear across the secondary winding 5 of the transformer. Assuming that the transformation ratio is 1:1, then the secondary voltage will likewise be $U_g$. The main valve 1 and the other controlled valves of the inverter are timed to fire by an impulse generator not shown in FIG. 2, which determines the frequency $f$ of the generated alternating voltage.

The negative half wave of the alternating voltage begins when the second main valve 2 in the other branch fires. When main valve 1 has fired at the instance $t_1$ the uncontrolled valve 11 likewise becomes conductive and therefore applies voltage to the oscillatory circuit formed by condenser 15 and inductance 16. The result is a sine-shaped charging current $i_C$ which charges condenser 15 according to the sine-shaped voltage $u_C$ which is superimposed upon the direct voltage. It will be seen in FIG. 4*c* that the flow of current through valve 11 ceases at the instant $t_2$ when the current $i_C$ passes through zero. The condenser voltage $u_c$ shown in FIG. 4*a* in full lines will then have risen to twice the D.C. voltage, viz. $2U_g$.

The capacity C of condenser 15 and the inductivity L of 16 are so determined that the resonant frequency $$f_0=\frac{1}{2x\sqrt{LC}}$$

exceeds the frequency $f$ of the alternating voltage determined by the controlling impulse generator. Consequently the duration of the half wave of the capacitor current $i_C$ is shorter than that of the positive half wave of the rectangular alternating voltage. The amplitude $I_C$ of the capacity current $i_C$ is $$I_C=U_g\sqrt{\frac{C}{L}}$$

and, as will be found, it is related to the maximum permissible load of the inverter, a circumstance which provides a second determinative factor for the values of L and C.

When the condenser current $i_C$ passes through zero the preparation of the oscillatory circuit for the commutating action is completed. According to the invention the commutating valve 7 is now fired at a time $t_3$ which precedes the end of the positive half wave of the alternating voltage by an interval of time which it is proposed should be equal to or greater than one quarter of the period $T_0=1/f_0$. Since valve 7 is thus rendered conductive for a current flowing in the opposite direction to that through valve 11 the oscillatory circuit can continue the interrupted oscillation, as shown by the negative branch of the $i_C$ curve in FIG. 4*c*. This reverse condenser current causes commutation, in the present instance the change-over from main valve 1 to main valve 2.

In the illustrated example it has been assumed for the sake of simplicity that the inverter load is an ohmic resistance across secondary winding 5. The wave form of the alternating current flowing through this resistance, which may be referred to as $i_W$ will then be the same as that of the alternating voltage $u_W$. The corresponding current in the primary windings 3 and 4 respectively of the transformer, which may be referred to as $i_T$, will then also be the same as $i_W$, since a transformation ratio of 1:1 has been assumed. Its shape is shown in FIG. 4*b*.

The paths taken by the current in the valve branch that has been considered are illustrated in detail in FIGS. 5 to 10.

Figure 5:
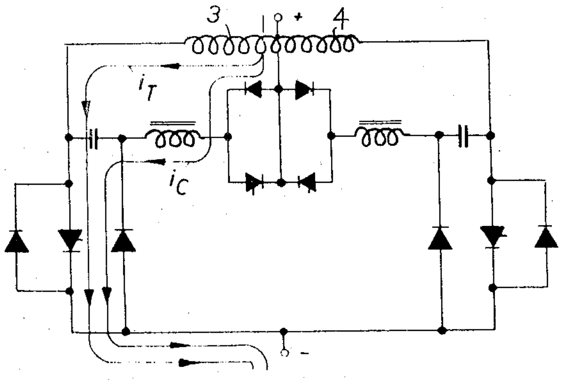
Figure 6:
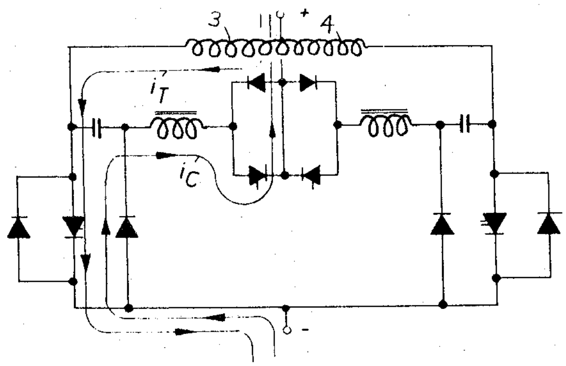

During the period current flows through the uncontrolled valve 11 from time $t_1$ to time $t_2$ the currents $i_C$ and $i_T$ take the paths indicated in FIG. 5. When the commutating valve 7 has fired the paths taken by the currents are as shown in FIG. 6. It will be readily seen that when the commutating valve 7 has fired the current flowing through the main valve 1 is the difference between the transformer current $i_T$ and the capacitor current $i_C$. The prescribed dimensions ensure that the transformer current will be lower than the maximum value $I_C$ of the condenser current $i_C$. Consequently equality between $i_C$ and $i_T$, when the current flowing through the main valve 1 passes through zero, will occur within a period which is shorter than one quarter of the period of oscillation $T_0=1/f_0$.

Figure 7:
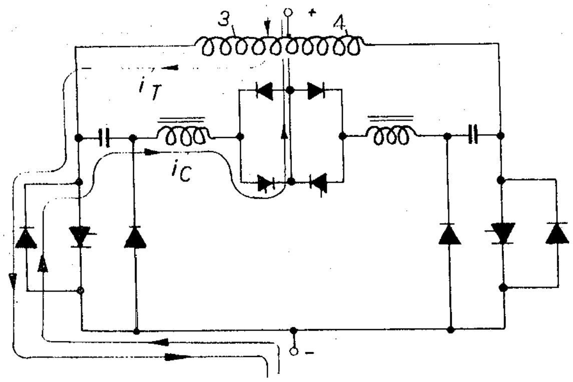
Figure 8:
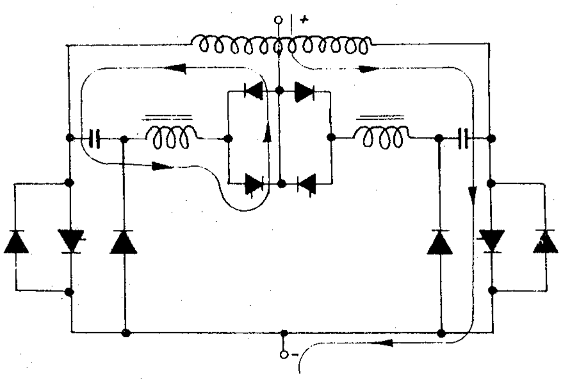
Figure 9:
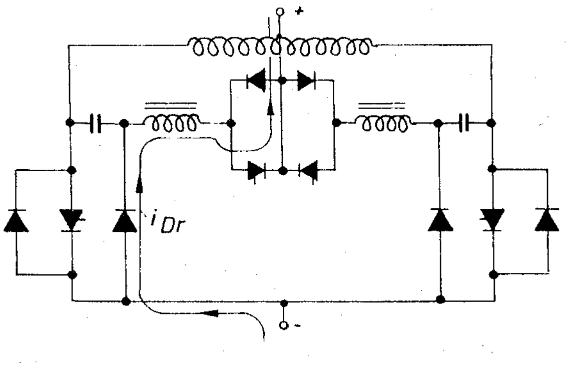

As the condenser current $i_C$ continues to rise beyond the transformer current $i_T$ the sign of the difference between the current reverses and the uncontrolled valve 9 will then begin to conduct. The path of the current when this is the case is shown in FIG. 7. This state of affairs continues until at time $t_5$ the main valve 2 in the second branch of the inverter fires.

The condenser voltage $u_C$ up to this instant is shown in FIG. 4*a*. This graph also includes the voltage across the inductance 16, which is indicated by the chain line curve.

As already mentioned, the commutating valve 7 fires at a time $t_3$ which is so chosen that the interval $t_5-t_3$ is equal to or longer than one quarter of the period $T_0=1/f_0$ of the commutating oscillatory circuit. The time elapsing from the time $t_4$ at which the main valve is quenched to the time $t_5$ when the next main valve fires is available to the main valve 1 for building up its resistance to the following positive voltage.

Since the antiparallel uncontrolled valve 9 starts to conduct after the instant of quenching $t_4$ the main valve 1 is not exposed to a negative reverse voltage after the current passes through zero and particularly not to a sudden reverse voltage surge. This is the particular advantage the proposed inverter provides.

Following the positive half wave of the alternating voltage a few transients still appear in the first valve branch and these restore condenser 15 to the state of charge it originally possessed at the beginning of the positive half wave. These events take place during the ensuing negative half wave of the alternating voltage. However, before these events are described it may first of all be noted that in the present example the interval $t_5-t_3$ is assumed to be exactly equal to the quarter period $T_0/4=1/4f_0$. Consequently the condenser voltage at the time $t_5$ when the second main valve 2 fires will have fallen precisely to the level of the direct voltage $U_g$, as will be seen in FIG. 4*a*.

When main valve 2 in the second branch of the inverter fires the transformation of the direct voltage across the half winding 4 to the half winding 3 causes the reverse polarity of the direct voltage $U_g$ to be transferred to the oscillatory circuit of the first valve branch. The result is a condenser current $i_C$, shown in FIG. 8, which internally circulates through winding 3 and the said oscillatory circuit. The shape of this current is represented in FIG. 4*c*. From FIG. 4*a* it will be understood that the condenser voltage $u_C$ rapidly falls to zero and then assumes a negative value. At the same time the voltage across the inductance falls to zero and then assumes a positive value.

As soon as the condenser voltage has reached the negative value $-2U_g$ the uncontrolled valve 13 begins to conduct. The effect of the inductance, in virtue of its magnetic energy, is then to push a current through this uncontrolled valve 13. This current is indicated in FIG. 4*d*, the relative curve being marked $i_{Dr}$. The current which falls exponentially passes through zero at the instant $t_7$ and current again ceases to flow through the uncontrolled valve 13.

Condenser 15 can now again discharge, generating an oscillation, because in virtue of the reversed current direction valve 11 is now conductive.

Figure 10:
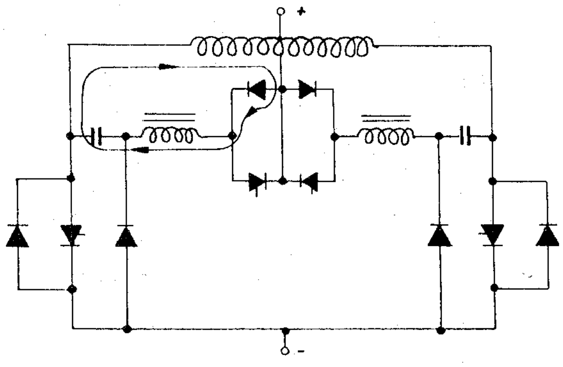

The path taken by this current is shown in FIG. 10. The discharge is completed at the time $t_8$ when the condenser voltage becomes zero and the condenser current $i_C$ passes through zero. In other words, the current-voltage conditions which had existed at the beginning of the positive half wave are restored.

The same applies to the second branch of the inverter. Corresponding events proceed in this branch as in the first branch.

Since the described events repeat themselves in the two valve branches and the associated commutating oscillatory circuits in the course of each full period of the alternating inverter voltage in exactly the same way, the inverter requires no special initial conditions for starting. Steady operation begins immediately the inverter is switched on.

Inverters according to the invention are not limited in construction to the described circuit arrangement. An alternative circuit for such a two-phase inverter is illustrated in FIG. 3. In this latter circuit, as already mentioned in the introduction, the two valve branches are associated by the series connection of the two D.C. sources which form a combined D.C. source for the inverter, and by the use of a single primary transformer winding. The commutating oscillatory circuits are connected as likewise shown in FIG. 3.

Figure 11:
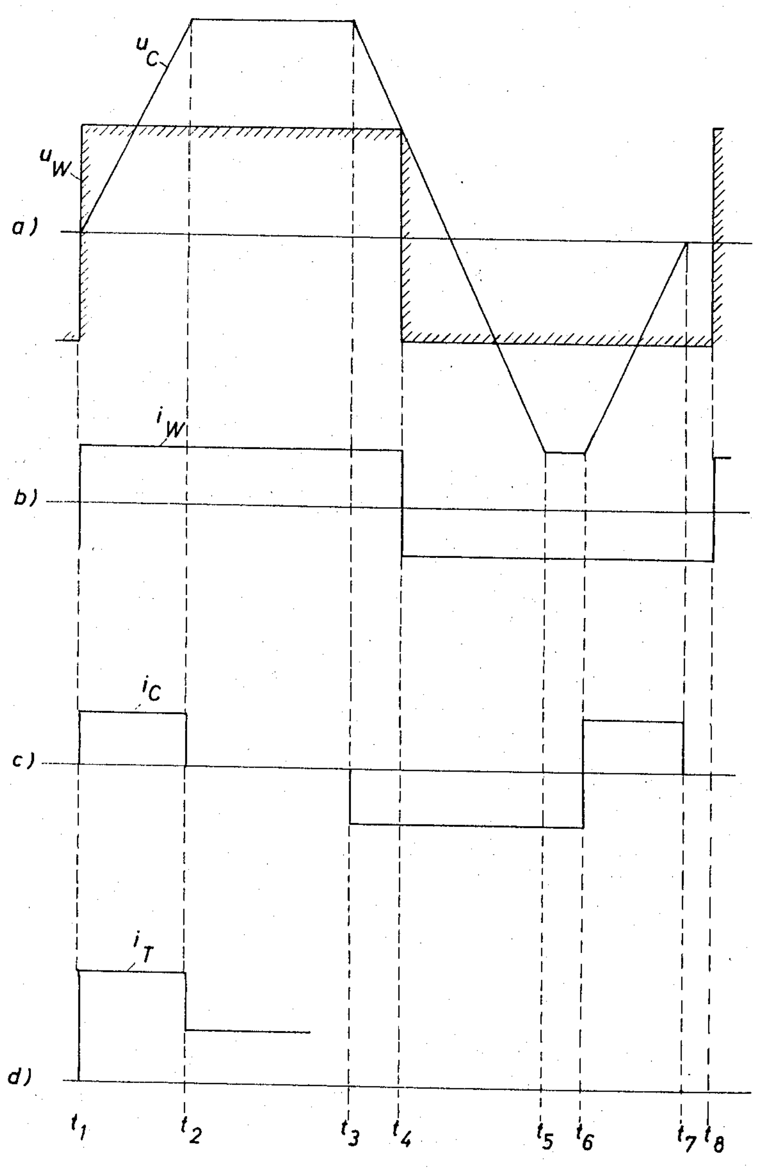
FIG. 11 is a graph showing current and voltage characteristics in an improved form of inverter according to the invention.

An inverter arrangement according to the invention permits a few functional improvements relating to the interaction of currents and voltages of the commutating oscillating circuits to be made by suitably designing the relevant electrical components. A step which permits the period of commutation to be controlled consists in embodying the inductances 16 and 18 respectively in reactance coils biased in the manner of transductors. In such a case it is preferred to provide the coils with a core having a rectangular magnetization loop and to bias the coils with a direct current which may be variable by reference to the load. The currents and voltages which arise in an inverter equipped with such reactors are illustrated in FIG. 11. These curves will be immediately understood in view of the explanations already given in connection with FIG. 4, if it is borne in mind that the state of magnetization of the cores of the reactors is directly related to the voltage/time area of their voltage $u_{Dr}$.

Figure 12:
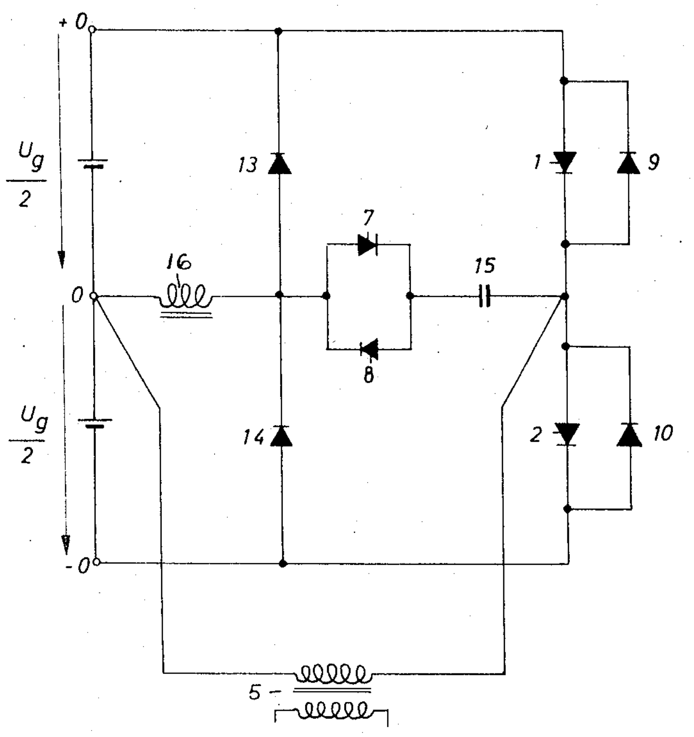
FIG. 12 is a wiring diagram in principle of a further embodiment.

The inverter lay-out illustrated in FIG. 3 comprising a D.C. source provided by two series-connected component D.C. voltages permits a few simplifying modifications to be made in the arrangement of the commutating oscillatory circuits. By way of example FIG. 12 represents a circuit in which the two commutating circuits hitherto provided are combined in a single oscillatory circuit.

Apart from the D.C. source delivering two component voltages $U_g/2$ the illustrated inverter comprises two controlled main valves 1 and 2, two uncontrolled valves 9 and 10 connected in antiparallel to the main valves and a transformer with a primary winding common to both valve branches and a secondary winding 5 which delivers into the A.C. load. The two valve branches further have in common one commutating oscillatory circuit comprising a condenser 15, an inductance 16 and two controlled valves 7 and 8 connected in antiparallel. In other words, the two commutating oscillatory circuits previously provided have here been replaced by a single oscillatory circuit containing a single condenser and a single inductance apart from the controlled commutating valves also provided in FIG. 3, whereas the uncontrolled valves connected in antiparallel across the commutating valves are dispensed with. Associated with the common commutating circuit are the uncontrolled valves 13 and 14 which were also present in the previous arrangement.

Figure 13:
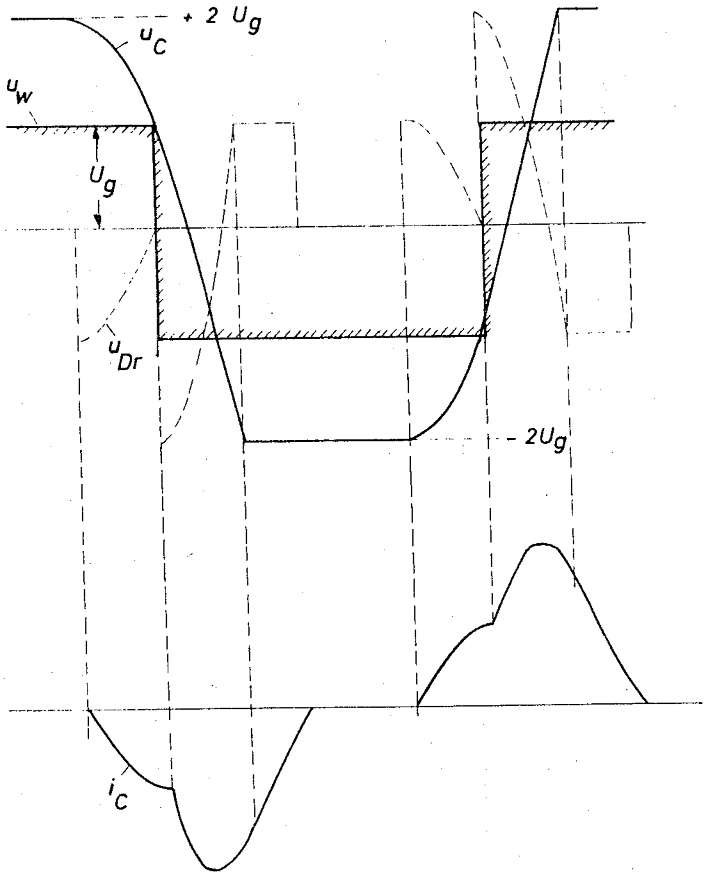
FIG. 13 is a graph showing voltage and current characteristics of an inverter of the kind exemplified in FIG. 12.

The manner in which this inverter functions will be readily understood from the graph in FIG. 13.

The shape of the curves show that the equalizing transients which occur in the circuits according to FIGS. 2 and 3 when commutation has taken place no longer appear. Each time the condenser is recharged in connection with each commutation it builds up a charge which permits the next commutation to take place. The commutating valves are fired, as before, at an instant preceding the end of the relative alternating voltage half wave by an interval of time $t_5-t_3$ which is equal to or exceeds one quarter of the period $T_0=1/f_0$ of the oscillatory circuit.

Figure 14:
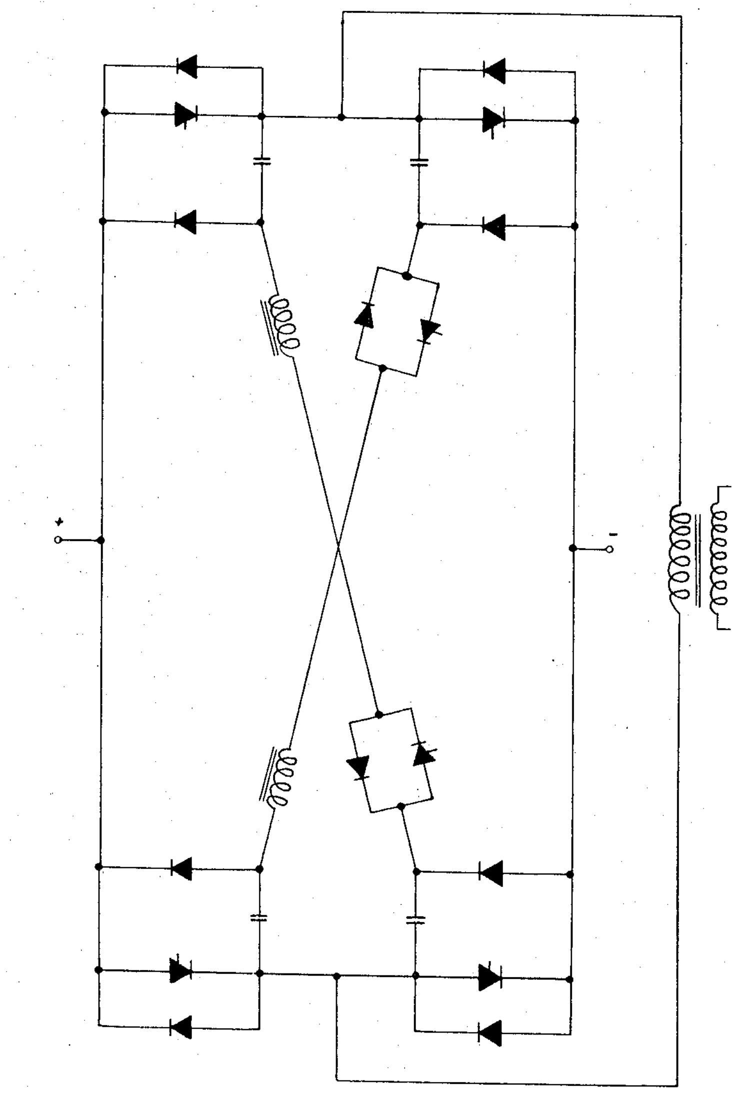
FIG. 14 is a final embodiment of the proposed inverter.

If two networks of the kind shown in FIG. 3 or FIG. 12 are combined to share a common D.C. voltage source and the same transformer, the result is a bridge network in which the division of the input voltage into two component voltages is no longer necessary. The circuit of such a bridge network is illustratively shown in FIG. 14. There are four valve branches containing main valves and uncontrolled valves connected in antiparallel across the said main valves. The associated commutating oscillatory circuits are combined in pairs, resulting in an arrangement which has only two oscillatory circuits and associated valves.

If any two inverters of the described kind are combined in a bridge network it is also possible for the two halves of the bridge to be controlled at a relative phase shift. This means that the phase position of the A.C. output voltage can be shifted or if necessary, particular harmonics of the resultant output voltages can be suppressed.

We claim:

1. A self-controlled inverter for generating from a source of unidirectional voltage an alternating voltage having a rectangular wave form which is not affected by the load,, comprising a plurality of inverter branches connected to said source of unidirectional voltage, each said inverter branch including a controllable valve operating as the main valve and an uncontrollable valve connected in anti-parallel therewith, and an oscillatory circuit for commutating said main valve comprising a condenser and an inductance in series with a controllable commutating valve and a second uncontrollable valve connected in anti-parallel, each said main valve and its associated commutating valve together with said oscillatory circuit establishing a network extending between the poles of said source of unidirectional voltage and being controlled such that said main valve in each said branch is fired at the beginning of the related half wave of alternating voltage to be generated and the associated commutating valve is fired at an instant which precedes the end of said half-wave of alternating voltage by a time interval at least equal to one quarter of the period oscillation of said oscillatory circuit, and a third uncontrollable valve connected to said oscillatory circuit which carries current and effects recharging of said condenser in preparation for the following half-wave of alternating voltage during the time interval the other valves do not carry current.

2. A self-controlled inverter for two-phase operation comprising two of said inverter branches each as defined in claim 1 and serially connected primary component windings on a transformer to establish a symmetrical network with a center tap on said transformer fed by said source of unidirectional voltage, said commutating oscillatory circuits associated with said valve branches together with the related series arrangement of said commutating valve and the second uncontrollable valve connected anti-parallel therewith being connected across the related component winding of said transformer primary, and said third uncontrollable valve being connected to that pole of said source of unidirectional voltage which is not connected to the component winding.

3. A self-controlled inverter for two-phase operation comprising two of said inverter branches each as defined in claim 1 and wherein there are two of said sources of unidirectional voltage connected in series as in a voltage double circuit and a common primary transformer winding, said commutating oscillatory circuits associated respectively with said inverter branches and the related series-connected arrangement of the commutating valve and the second uncontrollable valve connected anti-parallel therewith being connected across said common transformer primary winding and the third uncontrollable valve being connected to one of the outer poles of said series connected sources of unidirectional voltage.

4. A self-controlled inverter for two-phase operation as defined in claim 3 wherein said commutating oscillatory circuits associated with said inverter branches and the related series arrangement of a commutating valve with an uncontrollable valve connected anti-parallel therewith are constituted by a single common commutating oscillatory circuit comprising a condenser and an inductance, an arrangement in series therewith comprising two controlled commutating valves connected in anti-parallel, the second uncontrollable valves otherwise connected in anti-parallel to the commutating valves being omitted, whereas the third uncontrollable valves are connected to the common commutating oscillatory circuit and to the outer poles of said series connected sources of unidirectional voltage.

5. A self-controlled inverter as defined in claim 1, for two-phase operation, comprising four inverter branches each containing a main valve, connected in a single phase bridge network, the commutating oscillatory circuits associated respectively with said four inverter branches together with the series connected arrangement of a commutating valve and an uncontrollable valve connected anti-parallel therewith being combined into two commutating oscillatory circuits.

6. A self-controlled inverter as defined in claim 5 wherein the main valves of the two halves of said bridge are controlled so as to operate with a relative phase shift.

7. A self-controlled inverter as defined in claim 1 wherein the respective inductances of said commutating oscillatory circuits are established by core-type reactance coils having a direct current biasing coil on the core, said cores having a rectangular magnetization loop, and the energization of each said biasing coil being variable with the load.

References Cited by the Examiner

UNITED STATES PATENTS 3,207,974 9/1965 McMurray ---------- 321—45

JOHN F. COUCH, *Primary Examiner.*

W. SHOOP, *Assistant Examiner.*